W. C. KING.
Candy Jar Lids.
No. 138,503. Patented May 6, 1873.
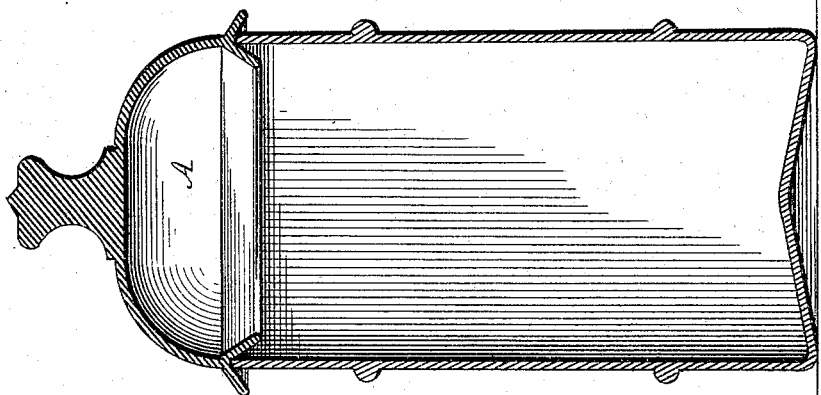
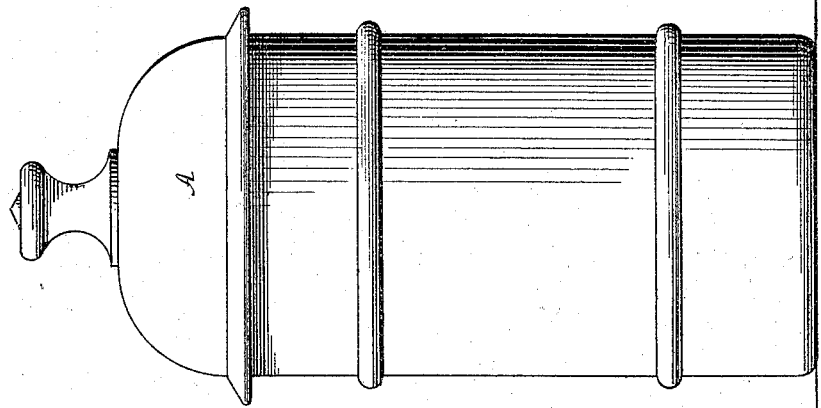
Attest:
James J. Johnston
Jno. D. Watten
Inventor:
William C. King
By Johnston & Grindlay
his Attorneys

UNITED STATES PATENT OFFICE.

WILLIAM C. KING, OF PITTSBURG, PENNSYLVANIA.

IMPROVEMENT IN CANDY-JAR LIDS.

Specification forming part of Letters Patent No. 138,503, dated May 6, 1873; application filed March 5, 1873.

*To all whom it may concern:*

Be it known that I, WILLIAM C. KING, of Pittsburg, in the county of Allegheny and State of Pennsylvania, have invented a new and useful Improvement in Glass Lid for Candy-Jar, the same being a new article of manufacture; and I do hereby declare that the following is a full, clear, and exact description thereof, reference being had to the accompanying drawing and to the letters of reference marked thereon.

The nature of my invention consists in providing a new article of manufacture, viz: A glass lid for candy-jars, said lid being formed by the pressing and finishing process.

To enable others to make my new article of manufacture, I will proceed to describe its construction.

In the accompany drawing, which forms part of my specification, Figure 1 is a side elevation of the lid and its jar. Fig. 2 is a vertical section of the same.

The lid A is formed in a mold by the pressing process well understood by the manufacturers of glassware. After the lid A is removed from its mold, it is "melted" at the "glory hole" of the glass furnace to remove the dingy appearance common to pressed glass. The heated or melted lid is then given the desired form or contour by means of suitable tools.

Lids constructed as hereinbefore described have the appearance of those formed by the glass-blowing process, but are more uniform in their outline, and can be made at far less cost than by the blowing process, with the further advantage of being made highly ornamental without increase of labor or cost.

I wish it clearly understood that I do not claim broadly a pressed lid constructed of glass, for such device is old.

Having thus described my improvement, what I claim as of my invention, is—

A new article of manufacture, viz., a lid for candy-jars, said lid being constructed by the pressing and polishing process, substantially as hereinbefore described.

WM. C. KING.

Witnesses:
   A. B. HAY,
   JAMES J. JOHNSTON.